(12) United States Patent
Szczukiewicz et al.

(10) Patent No.: US 11,489,421 B2
(45) Date of Patent: Nov. 1, 2022

(54) LINEAR MOTOR AND SECONDARY PART FOR A LINEAR MOTOR

(71) Applicant: ETEL S.A., Motiers (CH)

(72) Inventors: Sylwia Szczukiewicz, Colombier (CH); Loïc Moreno, Guyans-Vennes (CH)

(73) Assignee: ETEL S.A., Môtiers (CH)

(*) Notice: Subject to any disclaimer, the term of this patent is extended or adjusted under 35 U.S.C. 154(b) by 221 days.

(21) Appl. No.: 16/710,683

(22) Filed: Dec. 11, 2019

(65) Prior Publication Data

US 2020/0195106 A1  Jun. 18, 2020

(30) Foreign Application Priority Data

Dec. 12, 2018  (EP) ........................ 18211859

(51) Int. Cl.
*H02K 15/06* (2006.01)
*H02K 41/03* (2006.01)
*H02K 5/08* (2006.01)

(52) U.S. Cl.
CPC ............. *H02K 15/061* (2013.01); *H02K 5/08* (2013.01); *H02K 41/031* (2013.01)

(58) Field of Classification Search
CPC ........... H02K 15/06; H02K 41/03; H02K 5/08
See application file for complete search history.

(56) References Cited

U.S. PATENT DOCUMENTS

| | | | |
|---|---|---|---|
| 4,749,921 A | 6/1988 | Chitayat | |
| 7,989,993 B1* | 8/2011 | Li | H02K 41/03 310/12.24 |
| 2002/0125780 A1* | 9/2002 | Shiratori | H02K 1/278 310/156.21 |
| 2003/0160524 A1 | 8/2003 | Hwang et al. | |
| 2006/0175907 A1 | 8/2006 | Shikayama et al. | |
| 2007/0052303 A1 | 3/2007 | Thirunarayan-Kumar et al. | |
| 2007/0152513 A1* | 7/2007 | Shikayama | H02K 41/03 310/12.25 |
| 2015/0162812 A1 | 6/2015 | Da Conceicao Rosa | |
| 2019/0006902 A1 | 1/2019 | Fernandes Goncalves et al. | |
| 2019/0115817 A1 | 4/2019 | Monaghan et al. | |

FOREIGN PATENT DOCUMENTS

| | | | |
|---|---|---|---|
| CN | 104967276 A | * | 10/2015 |
| CN | 104967276 A | | 10/2015 |
| DE | 10 2015 222 265 A1 | | 5/2017 |
| EP | 2 884 638 A1 | | 6/2015 |
| EP | 3 422 537 A1 | | 1/2019 |
| EP | 3 471 245 A1 | | 4/2019 |

* cited by examiner

*Primary Examiner* — Eduardo Colon Santana
*Assistant Examiner* — Bradley R Brown
(74) *Attorney, Agent, or Firm* — Carter, DeLuca & Farrell LLP

(57) ABSTRACT

A secondary part provides a magnetic path for a primary part of a linear motor and includes a spacer element as well as yoke plates forming two limbs, which are arranged for an attachment to the spacer element so that—situated opposite each other—they extend in planes parallel to the magnetic path. In addition, the secondary part includes a plurality of permanent magnets, which are fixed in place on inner sides of the yoke plates pointing toward the magnetic path. The permanent magnets each have a width that decreases in an extension direction perpendicular to the magnetic path.

19 Claims, 11 Drawing Sheets

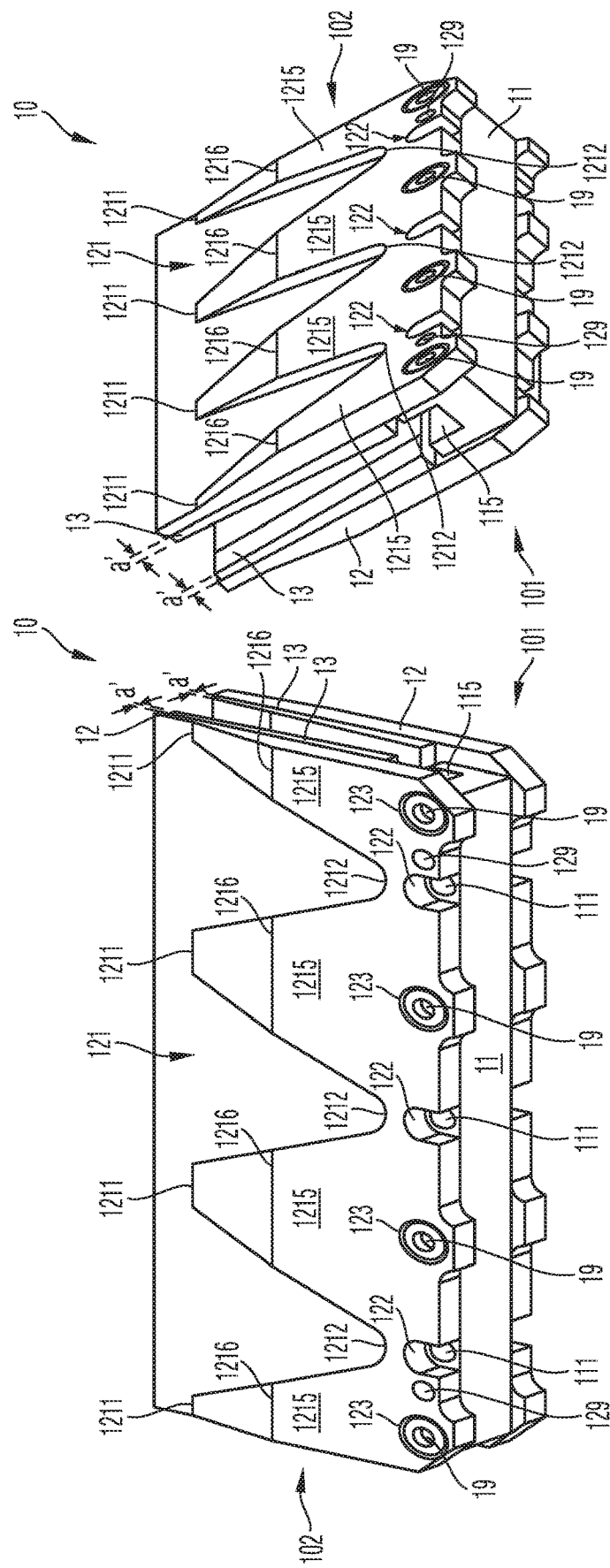

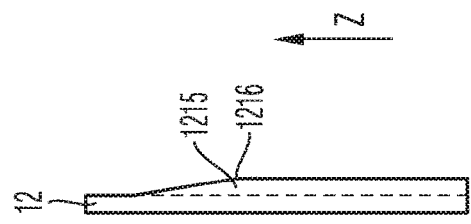
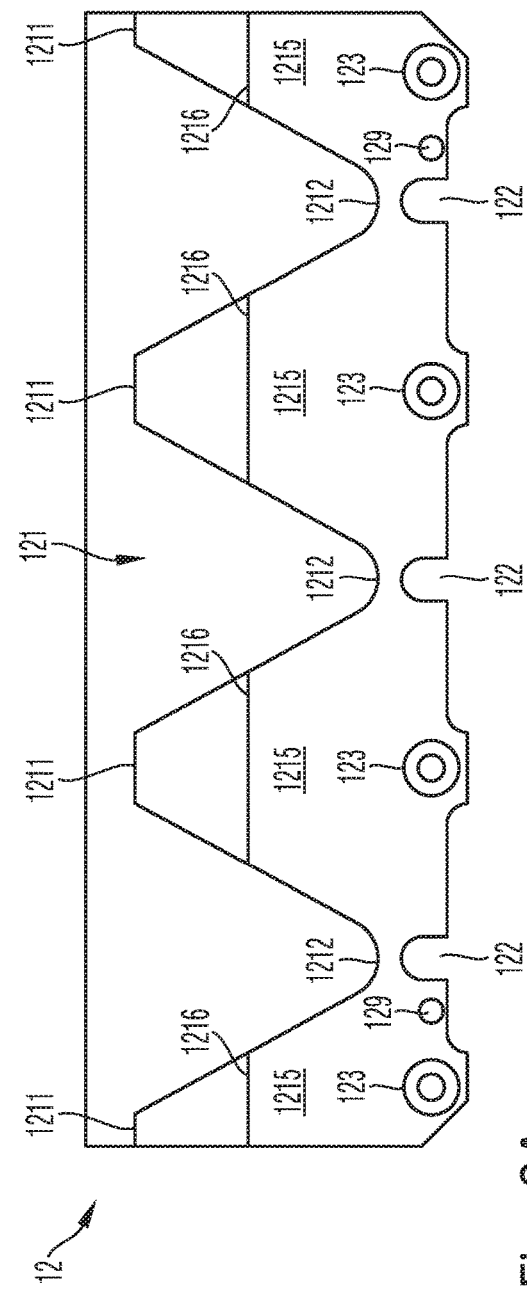
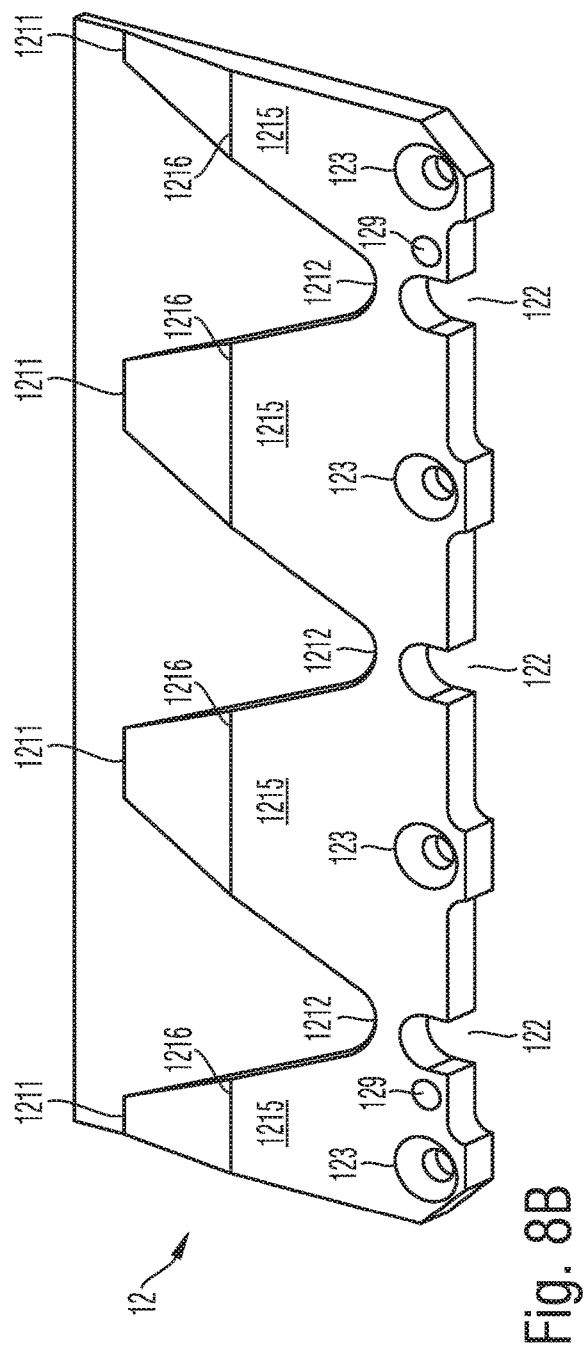

LINEAR MOTOR AND SECONDARY PART FOR A LINEAR MOTOR

CROSS-REFERENCE TO RELATED APPLICATIONS

The present application claims priority to application Ser. No. 18/211,859.6, filed in the European Patent Office on Dec. 12, 2018, which is expressly incorporated herein in its entirety by reference thereto.

FIELD OF THE INVENTION

The present invention relates to a linear motor and to a secondary part for a linear motor.

BACKGROUND INFORMATION

Examples of ironless linear motors, e.g., coreless linear motors, are described in U.S. Patent Application Publication No. 2006/0175907, U.S. Pat. No. 4,749,921, European Published Patent Application No. 2 884 638, and U.S. Patent Application Publication No. 2015/0162812.

In addition, European Published Patent Application No. 3 422 537 and U.S. Patent Application Publication No. 2019/0006902 describe an ironless linear motor, in particular the primary part of the ironless linear motor.

For instance, linear motors are used when a highly precise and possibly also rapid positioning of objects such as a machine part of a machine tool is desired. Via a suitable interface, the primary part of the linear motor may be directly connected to the machine part to be moved or to some other object. In contrast to a conventional rotary motor, there is no need for a transmission situated between the linear motor and the object to be driven.

For applications that require particularly precise positioning, what are referred to as ironless linear motors are particularly well suited, in which no core, e.g., an iron core, is allocated to at least one coil provided on the primary part. This makes it possible to avoid interfering cogging forces. However, correspondingly higher coil currents are required in order to allow for the generation of sufficiently large forces on the primary part of the linear motor also in the absence of a core. For example, the coils are provided in the form of premolded single coils. This means that the wire used to form the coils and, for instance, provided with an insulation layer is not wound directly onto a core but, for example, is wound without a core and then installed to produce the electric motor. In the process, the coreless single coil may be placed onto an iron core integrated into the electric motor; however, it may also be the case that the single coil is operated as a so-called "air coil" in the electric motor without an associated core.

Especially when a linear motor is meant to be used for the highly precise and possibly also rapid positioning of objects such as a machine part of a machine tool, a low weight is advantageous. Not only the primary part which, as mentioned, is provided without an iron core, for example, poses a challenge in this context.

The secondary part of the linear motor, too, is to be optimized, e.g., with regard to its weight. This applies in particular when the secondary part including the primary part, i.e., the entire motor, is coupled with the primary part of another motor, for instance.

At the same time, however, the secondary part must satisfy requirements with regard to stability.

Problematic in this context is that yoke plates which are fitted with permanent magnets and provide the magnetic path for the primary part are exposed to continuous forces as a result of the magnetic field of the permanent magnets, which may lead to bending and thus to deformations of the magnetic path.

Excessive bending or an excessive deformation of the secondary part could have the result that the primary part touches the permanent magnets and will be damaged in the process. If such contact occurs, a coil of the primary part could possibly also be contacted so that a short-circuit might be produced. This contact and/or damage must be prevented under all circumstances.

It is of course possible to enlarge the width of the air gap in order to avoid such a deformation/contact, which allows for greater tolerances in the deformation; however, this would result in performance losses. On the other hand, strong magnets and a small air gap are desirable in order to achieve a high magnetic flux density and thus high forces for the acceleration of the primary part.

Another approach for avoiding such an excessive deformation/contact is described in European Published Patent Application No. 3 471 245 and U.S. Patent Application Publication No. 2019/0115817, according to which the yoke plates are provided with reinforcement structures in order to reinforce the secondary part and to counteract the creation of the described bending. Similar approaches are described in U.S. Pat. No. 7,989,993 and U.S. Patent Application Publication No. 2007/0052303.

SUMMARY

Example embodiments of the present invention provide a secondary part for a linear motor that avoids a decrease in the size of the air gap in an improved manner.

According to example embodiments, a secondary part provides a magnetic path for a primary part of a linear motor and includes a spacer element as well as two yoke plates forming limbs, which are arranged to be attached to the spacer element so that—situated across from each other—they extend in planes parallel to the magnetic path. In addition, the secondary part includes a plurality of permanent magnets, which are fixed in place on inner sides of the yoke plates pointing toward the magnetic path. The permanent magnets have a width that decreases in an extension direction that is perpendicular to the magnetic path.

According to example embodiments, an ironless linear motor includes a secondary part, as described above, and a primary part, which is arranged for linear movement along the magnetic path.

For example, the linear motor is an ironless (i.e. coreless) linear motor in which the coils of the primary part are provided without a core.

For example, the secondary part is provided as a base profile system having a substantially U-shaped cross-section, for instance, the base profile system including the spacer element, the two yoke plates, and the permanent magnets. Additional components, such as fastening devices, etc., may be part of the base profile system as well. In the same manner, multiple spacer elements may be provided, which, for instance, are placed one behind the other in the longitudinal direction, i.e., along the magnetic path of the secondary part, as well as a correspondingly greater number of yoke plates.

The spacer element may be arranged to guide the primary part along the magnetic path.

For example, a base of the magnetic path is formed by a groove-type recess of the spacer element, into which the primary part is partially inserted. The yoke plates form the two limbs of the, for instance, U-shaped cross-section. They are fixed in place on the spacer element and extend upwardly from there along an extension direction, e.g., substantially perpendicular to the longitudinal extension of the groove-type recess, i.e., perpendicular to the direction of the magnetic path.

The yoke plates may be made from iron or steel, for instance. They are arranged to accommodate permanent magnets on their respective inner sides.

The permanent magnets may be arranged in the longitudinal direction of the secondary part with alternating poles ("north-south-north-south-north-south . . ."), the sequence on the other side of the secondary part, i.e., on the yoke plate arranged opposite thereto, being complementary ("south-north-south-north-south-north . . ."), which ensures that the north and south poles are always located across from each other. For example, the permanent magnets are arranged as magnet plates and are placed at a small distance from one another, e.g., 1 mm to 3 mm. The magnet plates may have a profile (that deviates from a simple rectangular cross-section), which is described in greater detail below.

The spacer element, for instance, is also made from iron or steel, e.g., from stainless steel.

As an alternative to iron/steel, other materials that feature high magnetic permeability may be used both for the spacer element and the yoke plates.

When the yoke plates are fitted with the permanent magnets and fixed in place on the spacer element, the permanent magnets are aligned with limbs of the spacer element, for instance, which define the groove-type recess, for example.

To fix the secondary part in place in an application, e.g., to fasten it to a machine part, the spacer element may have a number of assembly points, which are provided in the form of assembly recesses, for instance. For example, the assembly points may be arranged in the form of threaded bores. The secondary piece is then secured in place on the machine part with the aid of screws, for instance, which engage with the assembly recesses. It may be provided that the yoke plates are not affected by the fastening of the secondary part in the application. For instance, the screws used for the fastening touch only the spacer element but not the yoke plates.

It may furthermore be provided that the permanent magnets have a width that decreases in an extension direction that is oriented perpendicular to the magnetic path.

The width that decreases in the extension direction, i.e., the width of the permanent magnets that decreases with the height of the permanent magnets, may reduce or avoid a decrease in the air gap arising along the extension direction. For instance, in the case of permanent magnets having a constant width, bending of the yoke plates that occurs due to the magnetic attraction forces could lead to such a decrease in the air gap in an upper region of the magnetic path. The decreasing width in the extension direction, i.e., the width decreasing with the height of the permanent magnets, counteracts such a decrease in the air gap occurring in response to the bending of the yoke plates, for example.

The profile of the permanent magnets, i.e. the specific configuration of the width reduction, may be provided in different manners.

The permanent magnets may have a maximum width on their respective underside pointing toward the spacer element, and they may have a minimum width on their upper side. The width is thus reduced from the maximum width to the minimum width, the minimum width amounting to less than 98%, less than 95%, or less than 90% of the maximum width, for example.

The width decreases, e.g., along at least 40%, 60%, or 80% of the height of the respective permanent magnet in the extension direction, and this decrease may occur continuously along the mentioned at least 40%, 60%, or 80% of the height of the respective permanent magnet. For example, the width continuously decreases, starting from the underside, across the entire (i.e., 100% of the) height of the respective permanent magnet up to the upper side.

The width may decrease only in a subregion of the height of the respective permanent magnet. For instance, the width is constant at least in a lower portion of the respective permanent magnet in the extension direction and decreases only in an upper portion of the respective permanent magnet. The lower subregion, for instance, may be formed by the lower half or lower two-thirds (relative to the height) of the respective permanent magnet, and the upper subregion may be formed by the upper half or the upper third.

The width may continuously decrease, either across the entire height of the respective permanent magnet or only in the mentioned subregion.

The decrease in width may be provided in a linear fashion, e.g., such that the permanent magnets have a trapezoidal cross-sectional area that is arranged perpendicular to the magnetic path in each case.

The decrease in width may be non-linear and may take the form of a partial circle, a partial ellipse, or may be step-shaped, staggered, etc.

The width and the height along the length (in the direction of the magnetic path) of the respective permanent magnet may be constant so that the permanent magnets have a cross-sectional area situated perpendicular to the magnetic path that does not change in the direction of the magnetic path.

As already described, the magnetic attraction forces exerted on the yoke plates by the permanent magnets that are situated across from one another may cause the yoke plates to bend toward each other. However, because of the profiled permanent magnets described herein, the secondary part is arranged to provide an air gap that is substantially constant along the extension direction. For instance, a relatively small air gap is able to be provided in this manner, and it can be ensured at the same time that the primary part does not come into contact with the permanent magnets.

For reasons of symmetry, all permanent magnets of the secondary part may be profiled in the same manner, in which case the respective profile of the permanent magnets of one yoke plate is arranged in mirror symmetry with the respective profile of the permanent magnets of the other, opposite yoke plate.

Because of the profiled permanent magnets, it is also possible to permit bending of the yoke plates and thus dispense with reinforcement structures in the yoke plates, as described above. It may be provided that the two yoke plates have a substantially rectangular cross-sectional area situated perpendicular to the magnetic path in each case, or in other words, for instance, are not provided with a reinforcement structure.

The yoke plates may be provided with a reinforcement structure, which may allow the afore-described bending but not beyond a certain extent. Exemplary arrangements of this optional, additional reinforcement structure are described below.

For instance, in addition to the profiled permanent magnets on the inner sides, an individual reinforcement structure is fixed in place on the outer sides of the yoke plates. The reinforcement structure may be monolithically integrated into the respective yoke plate in that the yoke plate is subjected to a milling or a similar operation, for instance, or the reinforcement structure is installed on the yoke plate as a separate element, e.g., bonded or attached in some other manner. A broader plate may thus be patterned by a milling or similar operation and locally tapered in its width, or an initially thinner plate may be provided with a separately produced reinforcement structure.

Regardless of which one of the two described arrangements is provided, the reinforcement structure, which is configured as a periodic change in the plate width in the direction of the magnetic path, is provided in such a form that local minima of the reinforcement structure overlap with the assembly points of the spacer element along the direction of the magnetic path. For example, the magnetic path extends parallel to the longitudinal extension of the secondary part.

For example, the assembly points are provided at regular intervals along the longitudinal direction of the secondary part in the spacer element. In the longitudinal direction, or in the direction of the magnetic path, they overlap with the local minima of the reinforcement structure, for example.

Exactly one assembly point may be allocated to each local minimum of the reinforcement structure of one of the two yoke plates. The reinforcement structures of the two yoke plates are arranged without an offset relative to each other, for example. If the installation point is arranged as an uninterrupted recess, it is also possible to allocate two minima to each assembly point.

Because of the reinforcement structure, the width of the respective yoke plate is not constant in the longitudinal direction, for example. For instance, the width in the longitudinal direction regularly changes from a low value to a high value, the value difference possibly being in the range of 2 to 4 mm. A basic width of the yoke plate, e.g., in the lower region of the yoke plate, amounts to 6 mm, for example. Per period of the reinforcement structure, the value changes, e.g., once from the low value to the high value and once from the high value back to the low value.

The reinforcement structure may be arranged so that the distance along which the width of the yoke plate per period has the higher value decreases with an increasing height of the yoke plate. In other words, the reinforcement structure may be arranged such that at its lowest level, the distance along which the width of the yoke plate per period has the low value is minimal. Depending on the configuration of the reinforcement structure (more in this context will follow), this distance may also be substantially punctiform.

In locations where the distance along which the width of the yoke plate per period of the reinforcement structure has the low value is minimal, a local minimum of the reinforcement structure is present. In these locations, the yoke plate reinforcement brought about by the reinforcement structure thus has its smallest effect (with a view towards a reduction of the bending mentioned above).

In locations where the distance along which the width of the yoke plate per period of the reinforcement structure has the higher value is minimal, a local maximum of the reinforcement structure is present. In these locations, the yoke plate reinforcement brought about by the reinforcement structure thus has its greatest effect (with a view towards a reduction of the bending mentioned above).

In the longitudinal direction, the two yoke plates may terminate with a respective local maximum of the reinforcement structure at both ends.

For example, two magnetic periods may be provided for each period of the reinforcement structure in the longitudinal direction of the secondary part. Each magnetic period is created by two permanent magnets on each of the two yoke plates, which—as mentioned—are situated with alternating poles next to each other and with alternating poles across from each other. With respect to its width, a period of the reinforcement structure thus corresponds to approximately the width of four adjacently placed permanent magnets. The local maximum may be arranged such that two permanent magnets in each case are situated next to it in the longitudinal direction and counter to the longitudinal direction.

Each period of the reinforcement structure may have a reinforcement element whose width decreases along the height of the respective limb (formed by the respective yoke plate), e.g., by at least 50% and/or in a linear fashion. The reinforcement elements of the reinforcement structure may transition into one another in a seamless manner. This produces the aforementioned local minima and local maxima, i.e., minima and maxima of those distance sections along which the width has either the higher or the lower value.

In addition, it may be provided that each reinforcement element has a width in at least an upper subregion that decreases along the height of the respective limb. The reinforcement elements may thus be provided with a chamfer in each case. This further reduces the weight of the secondary part. For example, the chamfer extends along at least 10% of the total height of the respective reinforcement element.

The reinforcement elements of the reinforcement structure may have the form of a trapezoid or triangle, which is described in greater detail below. The local minima, i.e., the particular sections along which the width of the yoke plate has the lower value, are formed by the transition between two adjacent reinforcement elements, for instance, and this transition may be seamless.

The yoke plates may have fastening receptacles, which are configured for the fastening to the spacer element. For example, fastening devices are guided through the fastening receptacles of the yoke plates and fixed in place on the spacer element. In the direction of the magnetic path, these fastening receptacles overlap with the local maxima of the reinforcement structure (if provided), i.e., with those sections (which may also be substantially punctiform) where the distance along which the width of the yoke plate has the higher value is minimal. This achieves a further improvement in the stability.

Regardless of the optional reinforcement structure, the yoke plates may be arranged so as not to be contacted by fastening elements that engage at the installation points. Toward this end, the yoke plates have notches, for example, that expose the installation points of the spacer element.

The locations in which the yoke plates are fastened to the spacer element overlap with, for example, the local maxima of the reinforcement structure (if provided), and the locations in which the secondary part is fastened via the spacer element in an application, e.g., on a machine part, overlap with the local minima of the reinforcement structure.

In addition, the spacer element may have a multitude of recesses that remain free in order to reduce the weight even further.

The ironless linear motor, which has an afore-described secondary part, may be arranged as described in German Published Patent Application No. 10 2015 222 265, European Published Patent Application No. 2 884 638, and U.S. Patent Application Publication No. 2015/0162812, e.g., with regard to its electromechanical function.

Further features and aspects of example embodiments of the present invention are described in more detail below with reference to the appended Figures.

BRIEF DESCRIPTION OF THE DRAWINGS

FIGS. 6A and 6B are schematic perspective views of a secondary part.

FIGS. 8A to 8C schematically illustrate, in a plan view, a perspective view, and a cross-sectional view, respectively, a yoke plate.

DETAILED DESCRIPTION

Figure 1:
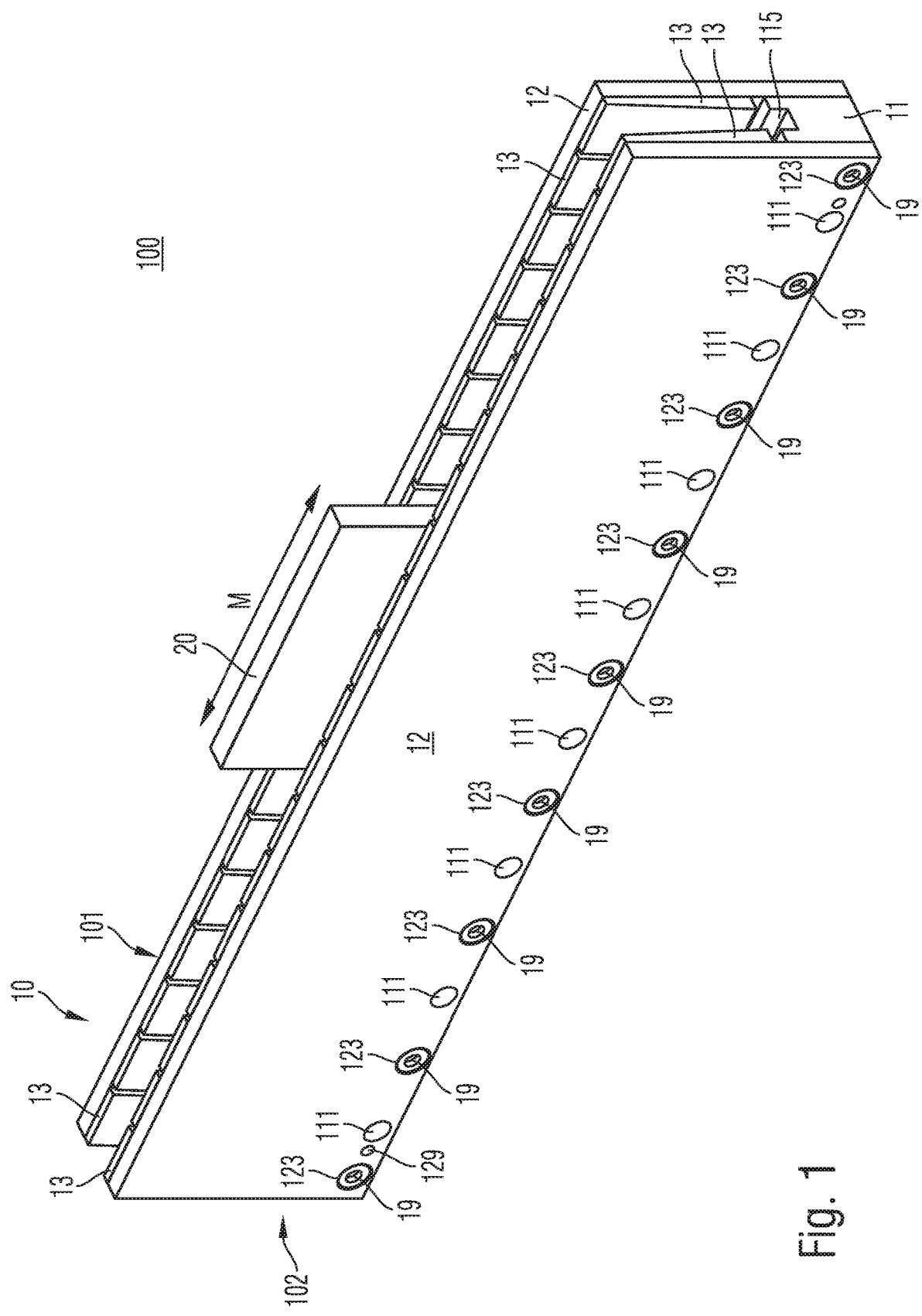
FIG. 1 is a schematic perspective view of a linear motor according to an example embodiment of the present invention.

FIG. 1 is a schematic perspective view of a linear motor 100 according to an example embodiment of the present invention.

Linear motor 100 includes a secondary part 10 and a primary part 20, secondary part 10 providing a magnetic path M, and primary part 20 being arranged for a linear movement along magnetic path M. The magnetic path extends along the direction indicated by the double arrow shown in FIG. 1 and thus extends in the longitudinal direction with respect to secondary part 10.

For example, linear motor 100 is arranged as an ironless linear motor in which the coils of primary part 20 have no core.

Primary part 20 may be arranged in the manner described in European Published Patent Application No. 3 422 537 and U.S. Patent Application Publication No. 2019/0006902, each of which is expressly incorporated herein in its entirety by reference thereto. A current is applied to the coils of primary part 20, e.g., via a current supply (see FIG. 11, reference numeral 21). Via a cable line (see FIG. 11, reference numeral 22), one or a plurality of measuring signal(s) is/are able to be read out such as a temperature, e.g., a temperature at one of the coils of primary part 20.

Secondary part 10 includes a spacer element 11, which may, for example, be arranged to guide primary part 20 along magnetic path M.

Figure 11:
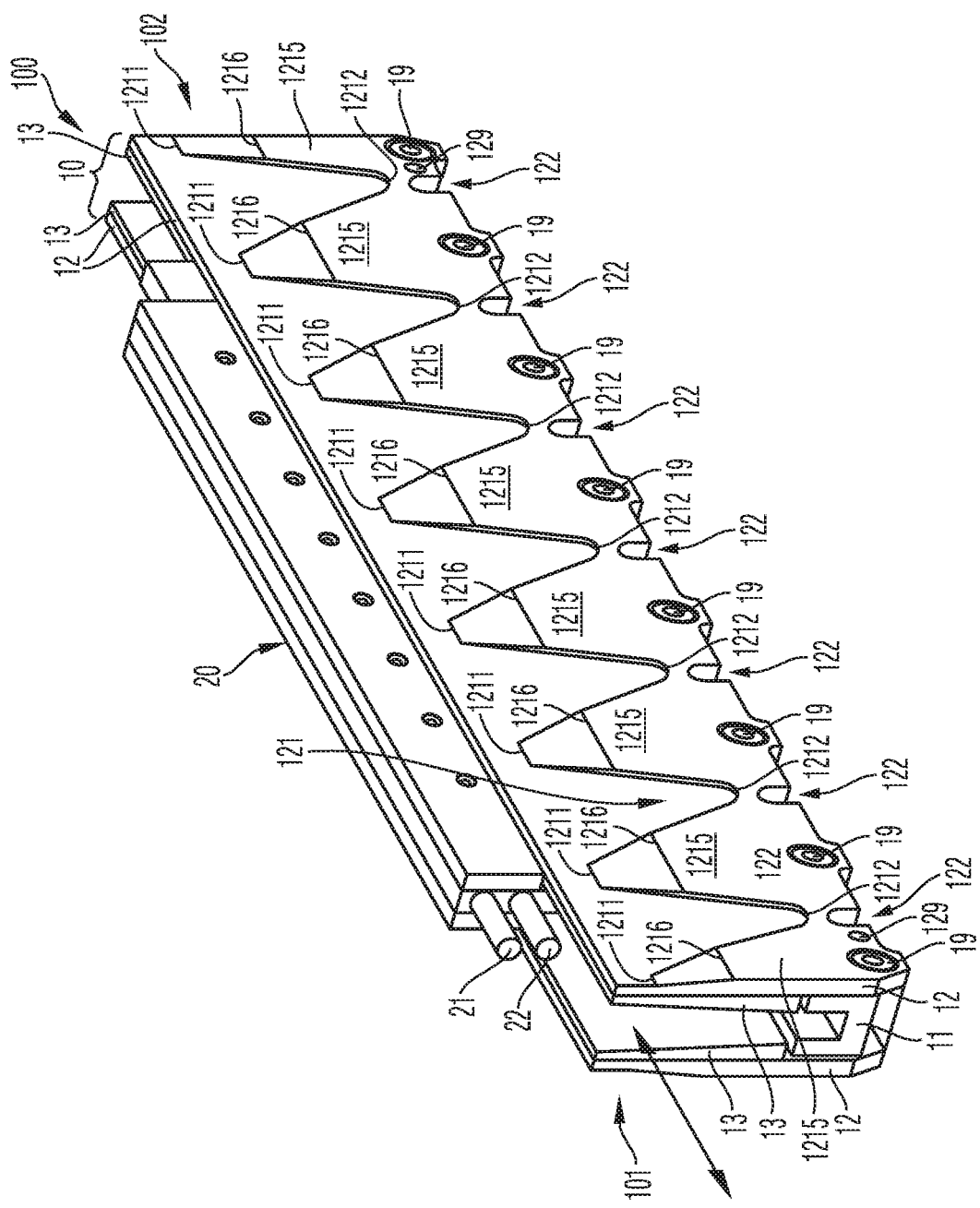
FIG. 11 is a schematic perspective view of a linear motor according to an example embodiment of the present invention.

A groove-type recess 115, for instance, is provided on spacer element 11 into which primary part 20 is partially inserted, as also illustrated in FIG. 11.

In addition, spacer element 11 may also include a number of installation points 111, which are configured for attaching the secondary part in an application. Via installation points 111, which are also shown in FIGS. 6A to 10, secondary part 10 is fastened to a machine part, for instance. Installation points 111 are arranged as threaded bores or as simple through passages, for example, with which the fastening screws or other fastening devices may interact.

At least one yoke plate 12 is provided on each side 101 and 102 of secondary part 10. Yoke plates 12 form limbs in that—situated across from each other—they extend in planes parallel to magnetic path M. This produces a base profile that has a U-shaped cross-section, whose base is formed by the undersides of yoke plates 12 and the underside of spacer element 11, for example.

Figure 7:
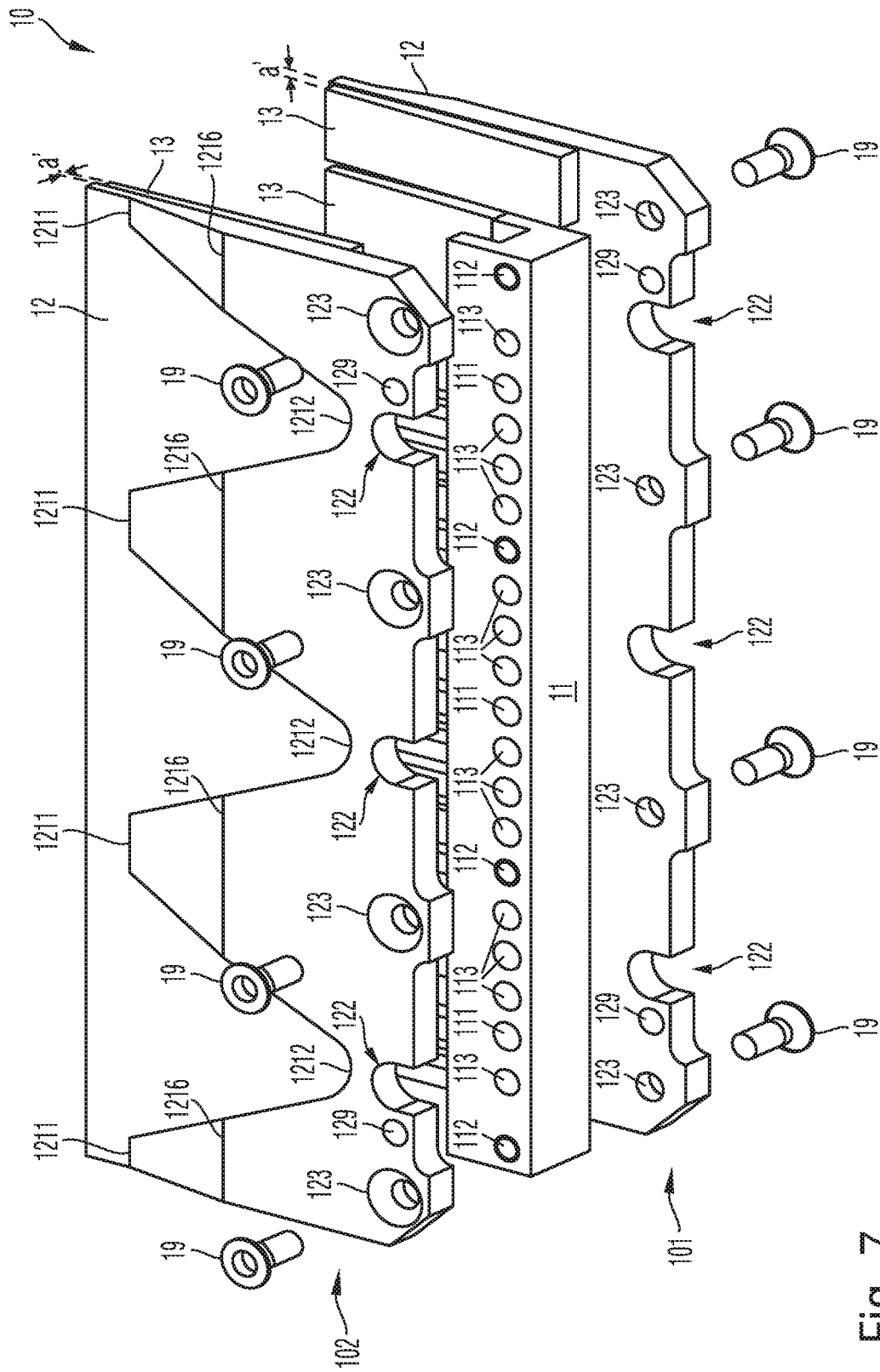
FIG. 7 is a schematic exploded perspective view of a secondary part.

For example, yoke plates 12 are provided with fastening receptacles 123, which are arranged for fastening purposes on spacer element 11 in order to accommodate fasteners 19, as shown in greater detail in FIG. 7. Fasteners 19, for instance, are arranged as screws, which are guided through fastening receptacles 123 and engage with threads 112 (see FIG. 7) of spacer element 11.

The two yoke plates 12 have a multitude of permanent magnets 13 on the inner sides. Permanent magnets 13 are arranged in the longitudinal direction of secondary part 10, i.e., in the direction of magnetic path M, with alternating poles ("north-south-north-south-north-south . . . "), the sequence on the other side of the secondary part, i.e., on the yoke plate situated opposite, being complementary ("south-north-south-north-south-north . . . "), thereby ensuring that the north and south poles are always located opposite each other.

For example, permanent magnets 13 are arranged as magnet plates and are located at a small distance, e.g., a distance of 1 mm to 3 mm, from one another in the longitudinal direction (parallel to magnetic path M), and the magnet plates may have a profile that deviates from a simple rectangular cross-section, which is described in greater detail below.

Figure 4:
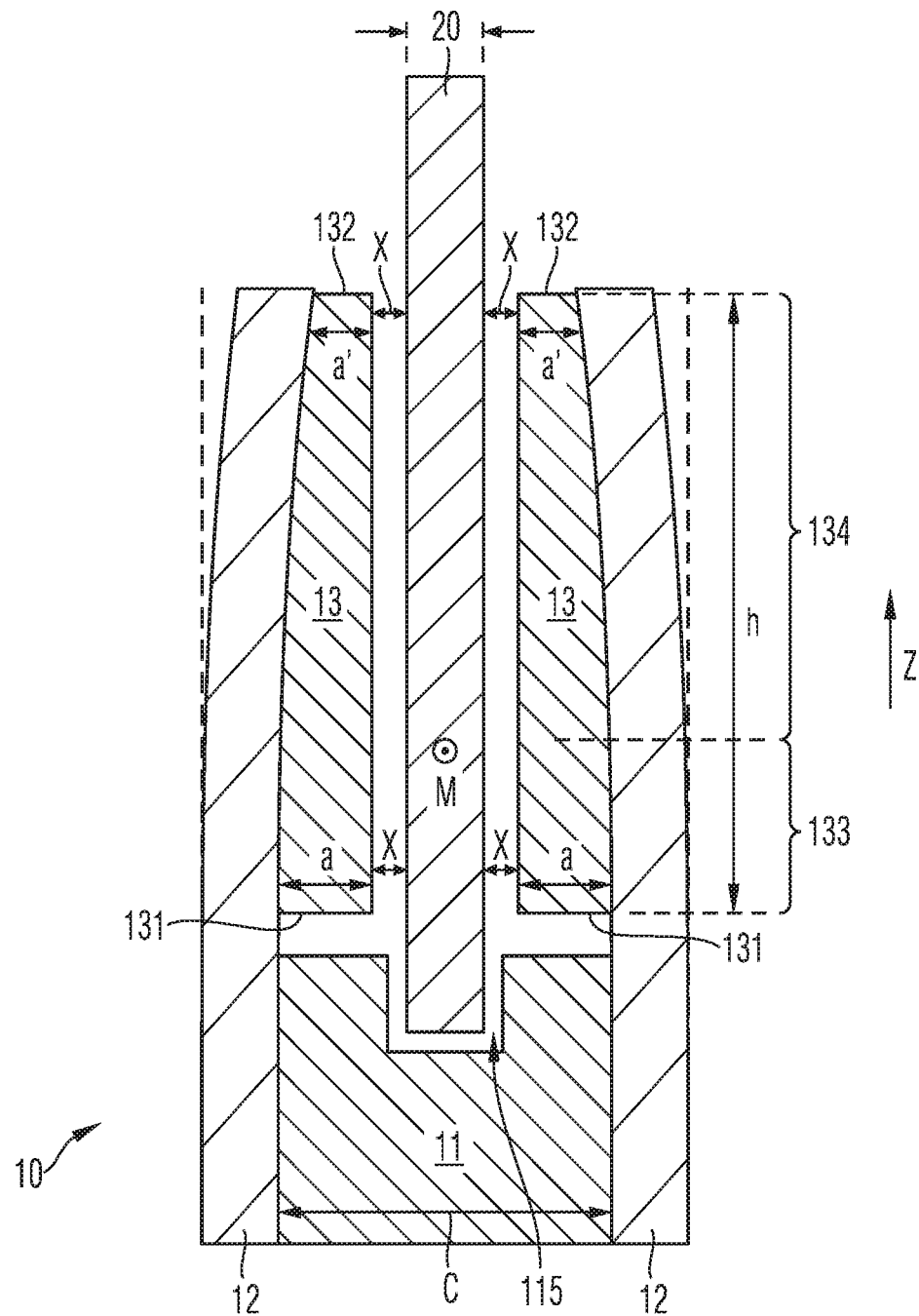
FIG. 4 is a schematic cross-sectional view of a secondary part with an inserted primary part according to an example embodiment of the present invention.

As schematically illustrated in the cross-sectional view of FIG. 4, permanent magnets 13 align with limbs of spacer element 11 which restrict the groove-type recess 115 for guiding primary part 20.

The magnet plates may have a profile as schematically illustrated in FIG. 1 and as described in greater detail below. To begin with, however, a technical problem that forms the basis hereof is described with reference to FIGS. 2 and 3.

Figure 2:
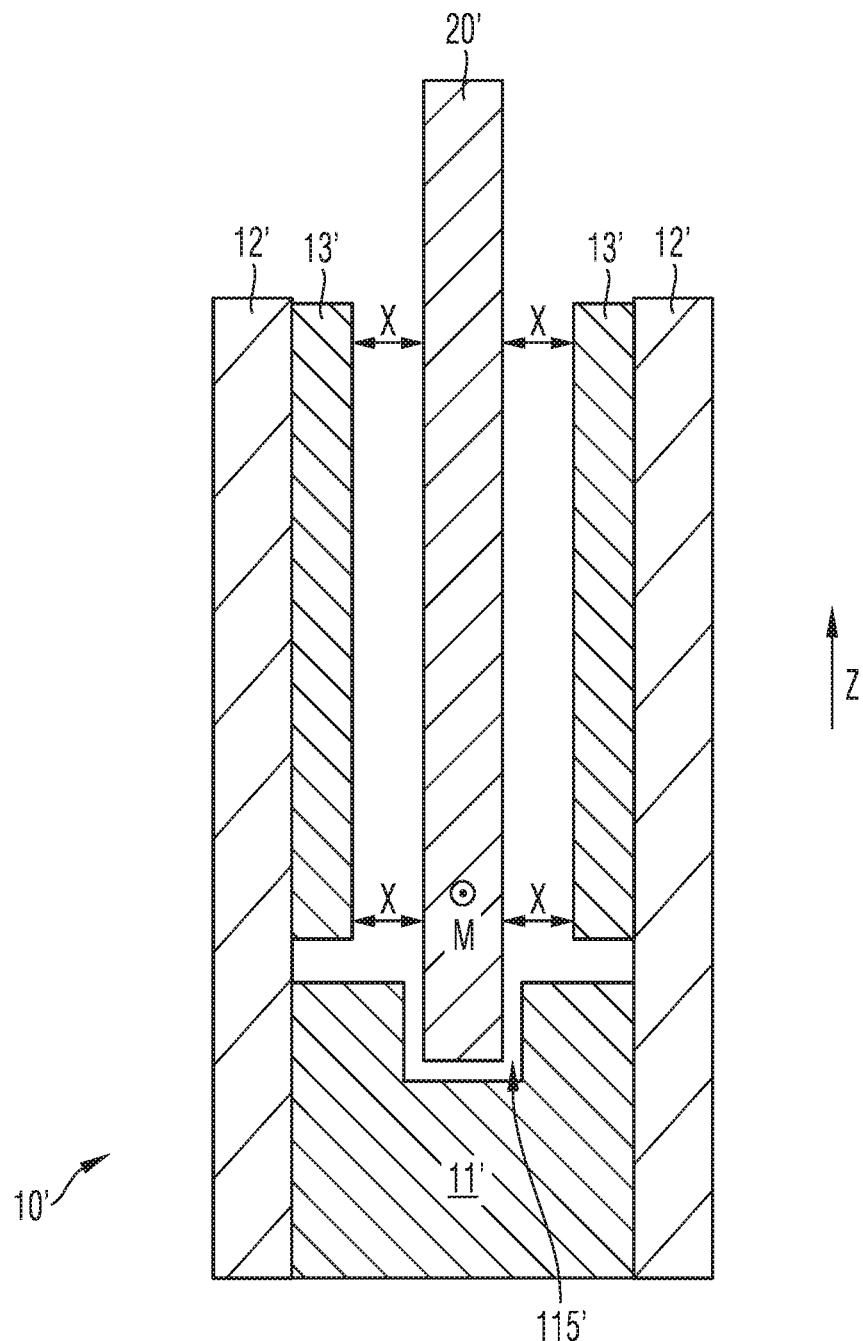
FIGS. 2 and 3 schematically illustrate, in cross-sectional views of a secondary part with an inserted primary part, a problem associated with conventional linear motors.
Figure 3:
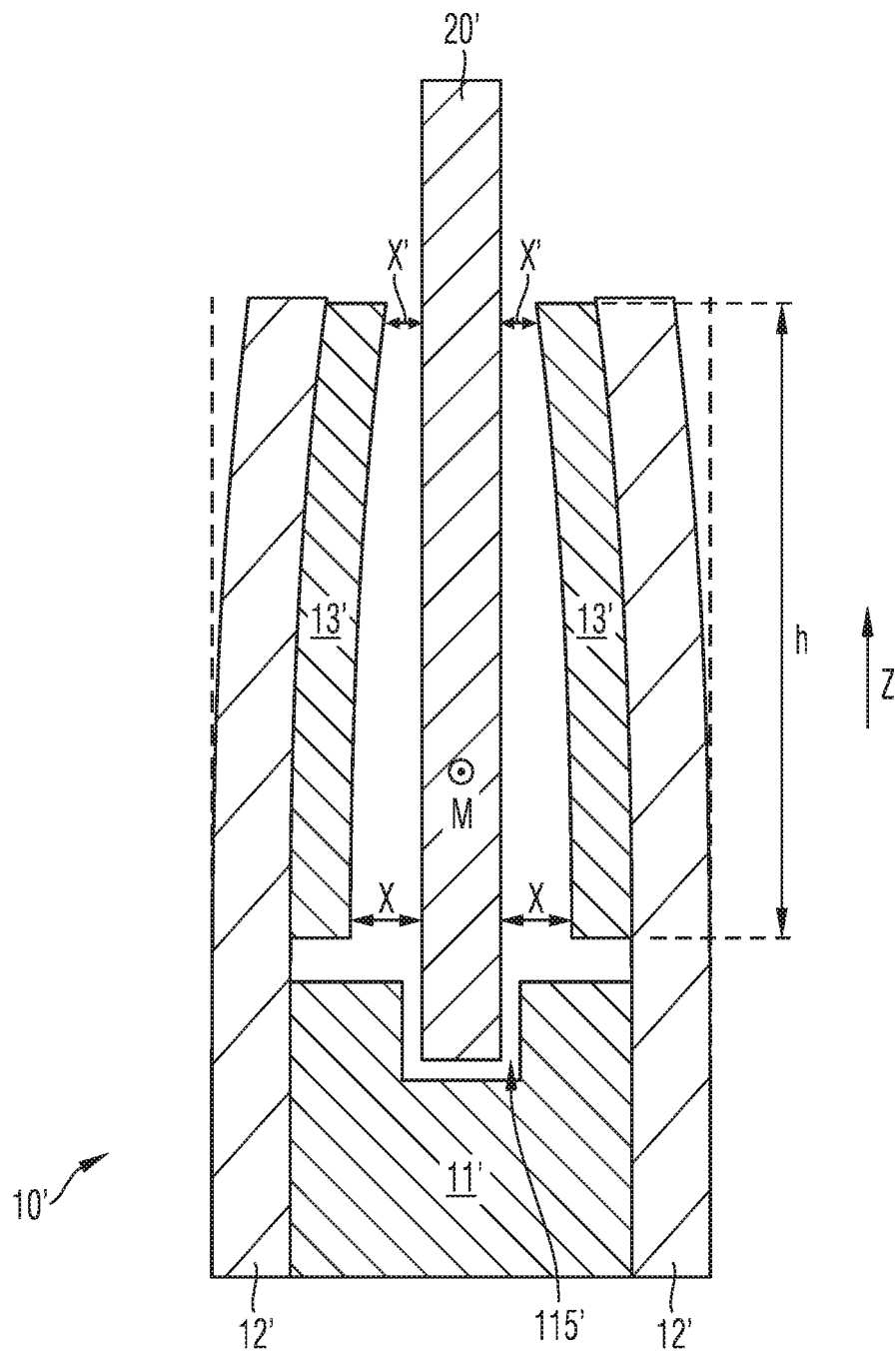

To illustrate the problem, FIGS. 2 and 3 are schematic cross-sectional views of a secondary part 10' and illustrate that secondary part 10' includes a spacer element 11' having a recess 115' as well as yoke plates 12' and permanent magnets 13'. These components may be arranged according to the above description. However, permanent magnets 13' are not profiled. Secondary part 10' provides a magnetic path M for a primary part 20'.

FIG. 2 illustrates an idealized configuration, which is nearly impossible to achieve in a practical application, in which width X of the air gap is constant along extension direction Z (i.e. perpendicular to magnet path direction M). FIG. 3 illustrates a (slightly exaggerated, i.e., not true to scale) more realistic configuration according to which yoke plates 12' bend toward each other due to the magnetic attraction forces of permanent magnets 13'. This results in an air gap whose width is reduced from a maximum value X in a lower region to a minimum value X' in an upper region along extension direction Z. With this reduction in the air gap width, there is an increasing risk that primary part 20' will come into contact with permanent magnets 13'.

In an effort to counteract this effect, it is provided, according to example embodiments of the present invention, that permanent magnets 13 is profiled, that is to say, that permanent magnets 13 have a width that decreases in extension direction Z oriented perpendicular to magnetic path M, as schematically illustrated in FIG. 5.

Despite the bending of yoke plates 12 that is very difficult to avoid in many practical applications, it can thus be ensured that the air gap will not be reduced to a width that poses the risk of contact being made between primary part 20 and permanent magnets 13. For example, secondary part 10 with its profiled permanent magnets 13 is arranged such that air gap width X is substantially constant along extension direction Z.

The profile of the permanent magnets, i.e., the width reduction, may be implemented in a variety of different manners.

For example, permanent magnets 13 have a maximum width a on their respective underside 131 pointing toward spacer element 11, and a minimum width a' at their respective upper side 132. The width of permanent magnets 13 is therefore reduced from maximum width a to minimum width a', for example, where minimum width a' amounts to, for example, less than 98%, less than 95%, or less than 90% of maximum width a, as schematically illustrated in FIG. 4.

The width decreases in extension direction Z, e.g., along at least 40%, 60%, or 80% of height h of respective permanent magnet 13. In certain example embodiments, the width decreases continuously starting from underside 131 across the entire (100% of) height h of respective permanent magnet 13 up to upper side 132, as schematically illustrated in FIGS. 4, 5(A), and 5(B).

The width may decrease only in a subregion of height h of respective permanent magnet 13. For instance, the width is constant at least in a lower portion 133 of respective permanent magnet 13 in extension direction Z, and decreases only in an upper portion 134 of respective permanent magnet 13, as illustrated in FIGS. 5(C) and 5(D). Lower subregion 133, for example, may be formed by the lower half or the lower two-thirds (in relation to height h) of respective permanent magnet 13, and upper subregion 134 may be formed by the upper half or the upper third.

Figure 5A:
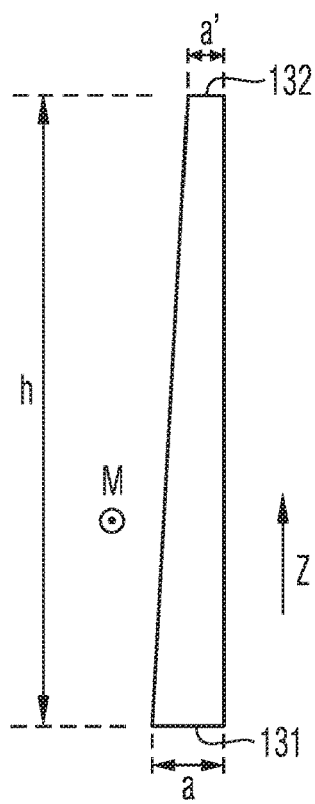
FIGS. 5(A) to 5(D) are cross-sectional views of a number of variants of a permanent magnet.
Figure 5B:
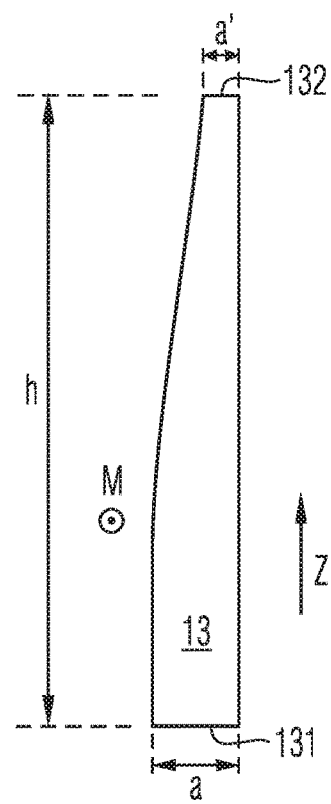
Figure 5C:
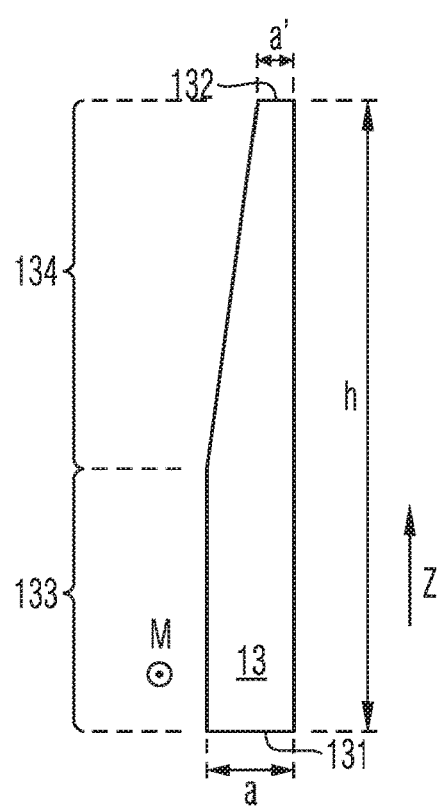
Figure 5D:
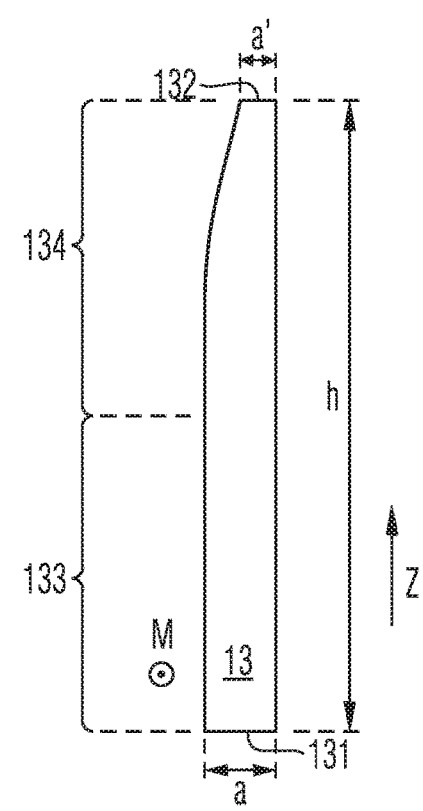

The width may decrease continuously, either across the entire height h of respective permanent magnet 13 (as schematically illustrated in FIGS. 4, 5(A), and 5(B)) or only in the mentioned subregion (as schematically illustrated in FIGS. 5 (C) and 5(D)).

The decrease in width may have a linear characteristic, e.g., such that permanent magnets 13 have a cross-sectional area that lies perpendicular to magnetic path M in each case (as schematically illustrated in FIG. 4 and FIG. 5(A)).

According to example embodiments, the decrease in width is not linear but in the form of a partial circle, a partial ellipse (as schematically illustrated in FIGS. 5(B) and 5(D)), or is arranged in a stepped, staggered, or similar form.

Width a/a' and height h may be constant along the length (in magnetic path direction M) of respective permanent magnet 13 so that permanent magnets 13 have a cross-sectional area arranged perpendicular to magnetic path M that remains unchanged in the direction of magnetic path M.

As illustrated in FIGS. 1 and 4, yoke plates 12 may have simple rectangular profiles, i.e., a substantially rectangular cross-sectional area arranged perpendicular to magnetic path M (in the unbent state, see FIG. 2).

For example, yoke plates 12 are attached to both outer sides of spacer element 11 and extend upwards from there along extension direction Z. Spacer element 11 may have a U-shaped profile that is defined by recess 115, and permanent magnets 13 fixed in place on the yoke plates are aligned parallel to yoke plates 12 above the legs of the U-shaped profile of spacer element 11. Primary part 20 is partially inserted into recess 115.

Width c of spacer element 11, for example, amounts approximately to the sum of twice the maximum width a of a respective permanent magnet 13, twice the air gap width X (e.g., at underside 131 of permanent magnet 13) and width b of primary part 20 inserted into recess 115.

Profiled permanent magnets 13, for example, are first fixed in place on yoke plates 12, e.g., bonded, whereupon yoke plates 12 and spacer element 11 are joined in order to form secondary part 10. Because of the magnetic attraction forces that are created in the process, the bending of yoke plates 12 that is schematically illustrated (not true to scale) in FIG. 4 then occurs, which, however, does not lead to a disadvantageous reduction in air gap width X because of profiled permanent magnets 13. Instead, the bending of yoke plates 12 may even be advantageous on account of profiled permanent magnets 13 because it leads to an enlargement of the ratio of magnetic material to magnetic path volume.

Profiled permanent magnets 13, for instance, may have a planar (non-profiled) boundary surface in each case, and this planar boundary surface is coupled with the, for instance, likewise planar inner side of respective yoke plate 12 with the aid of a bonding agent. The profiled (e.g., oblique or curved) side of respective permanent magnet 13 points toward magnetic path M. The planar inner side of yoke plate 12, for example, forms a base for permanent magnet 13 coupled thereto, which may bend in a non-linear fashion on account of the magnetic attraction forces as illustrated in FIGS. 3 and 4. This may lead to the creation of gaps between yoke plate 12 and coupled permanent magnet 13, but the bonding agent compensates for this. Thus, the bonding agent used for coupling permanent magnets 13 to yoke plates 12 may be selected and applied such that, for instance, the bonding agent compensates for the bending of yoke plates 12 and thereby ensures durable coupling between yoke plates 12 and permanent magnets 13 despite the bending.

FIGS. 6A and 6B schematically and exemplarily illustrate a perspective view of secondary part.

For example, yoke plates 12 are furthermore arranged not to be contacted by fastening elements that engage at installation points 111 of spacer element 11. Toward this end, yoke plates 12 are provided with notches 122, which expose installation points 111 of spacer element 11. Installation points 111 as well as the fasteners engaging therewith do not necessarily contribute to the stability of secondary part 10. Thus, in an application, secondary part 10 is installed such that the fasteners required for this purpose connect to installation points 111 of the spacer element without contacting yoke plates 12. Notches 122 contribute to the weight reduction.

In accordance with the above, however, bending of yoke plates 12 beyond a specific measure is to be avoided even in the case of profiled permanent magnets 13.

In order to reduce or avoid this further bending, yoke plates 12 may optionally be provided with a reinforcement structure, which is described in greater detail with reference to FIGS. 6A to 11. However, the reinforcement structure is optional and is to be provided only if—despite profiled permanent magnets 13—the bending of yoke plates 12 would lead to an excessive reduction in air gap width X in the absence of such a reinforcement structure.

At the outer sides, each of the two yoke plates 12 has a reinforcement structure 121, for instance. Reinforcement structures 121 serve the purpose of counteracting excessive bending of yoke plates 12.

As mentioned above, these reinforcement structures are not mandatory because profiled permanent magnets 13 permit, or are even meant to permit, bending of the yoke plates to at least a certain degree in order to achieve an air gap width X that is substantially constant along extension direction Z. For instance, reinforcement structures 121 are only provided to counteract or avoid bending that exceeds, or would exceed, this degree.

On each side, optional reinforcement structures 121 are formed by a periodic change in the plate width in the direction of the magnetic path (i.e., in the longitudinal direction of secondary part 10). Optional reinforcement structures 121 on both sides 101, 102 of secondary part 10 may be provided in identical form and also be aligned toward each other, i.e., without a mutual offset in the longitudinal direction. Optional reinforcement structures 121 may be provided on one or both secondary part sides 101, 102.

Optional reinforcement structure 121 has a multitude of local maxima 1211 and local minima 1212. In locations where the distance along which the width of yoke plate 12 per period of reinforcement structure 121 has the low value is minimal, a local minimum 1212 of reinforcement structure 121 is provided. At these locations 1212, the yoke plate reinforcement brought about by reinforcement structure 121 thus has its smallest effect (with a view toward avoiding the bending described above).

In locations where the distance along which the width of yoke plate 12 per period of reinforcement structure 121 has the higher value is minimal, a local maximum 1211 of reinforcement structure 121 is provided. At these locations, the yoke plate reinforcement brought about by reinforcement structure 121 thus has its greatest effect.

In the exemplary embodiments illustrated in FIGS. 6A to 11, four local maxima 1211 are provided as well as three local minima 1212 which are situated therebetween.

In the illustrated exemplary embodiments, optional reinforcement structure 121 is formed by a multitude of reinforcement elements 1215 which are linked to one another. One reinforcement element 1215 is provided for each period of reinforcement structure 121. The width of each optional reinforcement element 1215 decreases along the height of the respective limb, e.g., by at least 50%. In the case of a triangular reinforcement element, the decrease in width would thus amount to approximately 100%. The reinforcement elements are dimensioned such that, for example, the decrease in width along the height is provided in a linear fashion. The decrease in width creates local minima 1212 (i.e., at the locations where two reinforcement elements 1215 adjoin each other) and local maxima 1211, which are situated in the center of a respective period, for example.

For each period of optional reinforcement structure 121, precisely two magnetic periods, for example, are provided in the longitudinal direction of secondary part 10. In this exemplary embodiment, the width of each reinforcement element 1215 corresponds to the width of four permanent magnets 13 that are disposed next to one another in the longitudinal direction.

According to the dimensional information mentioned earlier by way of example, a magnetic period, for instance, has a length of a few centimeters, e.g., 32 mm. For example, permanent magnets 13 are approximately 14 mm in width and arranged in a 16 mm grid, i.e., at a distance ("gap") of 2 mm between individual permanent magnets 13. In this example, the magnetic period therefore has a length of 32 mm.

Each optional reinforcement element 1215 in the illustrated exemplary embodiments has a trapezoidal configuration. In other exemplary embodiments, reinforcement elements 1215 have a triangular configuration. Other forms are also possible, e.g., a sinusoidal form, etc. From the aspect of production technology, however, reinforcement elements 1215 with a straight extension, as shown in the figures, may be provided.

Optional reinforcement structure 121, for example, is milled into yoke plate 12. However, reinforcement structure 121 may be produced separately and then attached to yoke plate 12.

In addition, a specific alignment is provided between optional reinforcement structure 121 on the one hand and installation points 111 as well as fastening receptacles 123 on the other hand.

For example, exactly one installation point 111 and exactly one fastening receptacle are provided for each period of optional reinforcement structure 121.

Optional reinforcement structure 121 is situated on yoke plate 12 such that the local minima 1212 overlap with installation points 111 along the direction of the magnetic path. As a result, exactly one local minimum 1212 of reinforcement structure 121 of one of yoke plates 12 is allocated to each installation point 111. Installation points 111 may also be provided as uninterrupted recesses, e.g., as uninterrupted threaded bores, so that two oppositely situated local minima 1212 of both reinforcement structures 121 of yoke plates 12 are allocated to each installation point 111.

In the illustrated exemplary embodiments, optional reinforcement structure 121 is furthermore situated so that yoke plate 12 terminates at its two ends in the longitudinal direction with a local maximum 1211. As a result, the two installation points 111 arranged closest to the ends are located at a distance from the ends that amounts to one half of a period of reinforcement structure 121, exactly like the two next minima 1211.

The arrangement of installation points 111 in a grid according to a full period of optional reinforcement structure 121 also provides the advantage that it makes it possible to install secondary part 10 in an application precisely according to this grid measure. This may be advantageous in particular in the case of a sequential arrangement of multiple secondary parts in order to create longer magnetic paths for primary part 20. Sequentially arranged secondary parts 10 connect seamlessly to one another, e.g., along a straight line, so that, in the application, all coupling points (i.e., opposite points) for installation points 111 of sequentially arranged secondary parts 10 are able to be provided using the mentioned grid measure (and in particular independently of the positions of the transitions between sequentially arranged secondary parts 10).

In addition, optional reinforcement structure 121 may be arranged such that local maxima 1211 overlap with fastening receptacles 123 in the longitudinal direction. As mentioned, fastening receptacles 123 are used for fastening yoke plates 12 to spacer element 11. The overlap between local maxima 1211 on the one hand and fastening receptacles 123 on the other hand has the advantage that yoke plates 12 are attached to spacer element 11 at the particular points where yoke plates 12 have a maximum stiffness. The respective overlap between local maxima 1211 on the one hand and fastening receptacles 123 on the other hand may not be provided or only partially provided at the two ends of secondary part 10; in this case, the two (or four) fastening receptacles 123 are slightly offset in the direction of the center of secondary part 10, e.g., on account of solid geometry requirements.

Additional optional features of secondary part 10 are described with reference to the remaining Figures.

Figure 10:
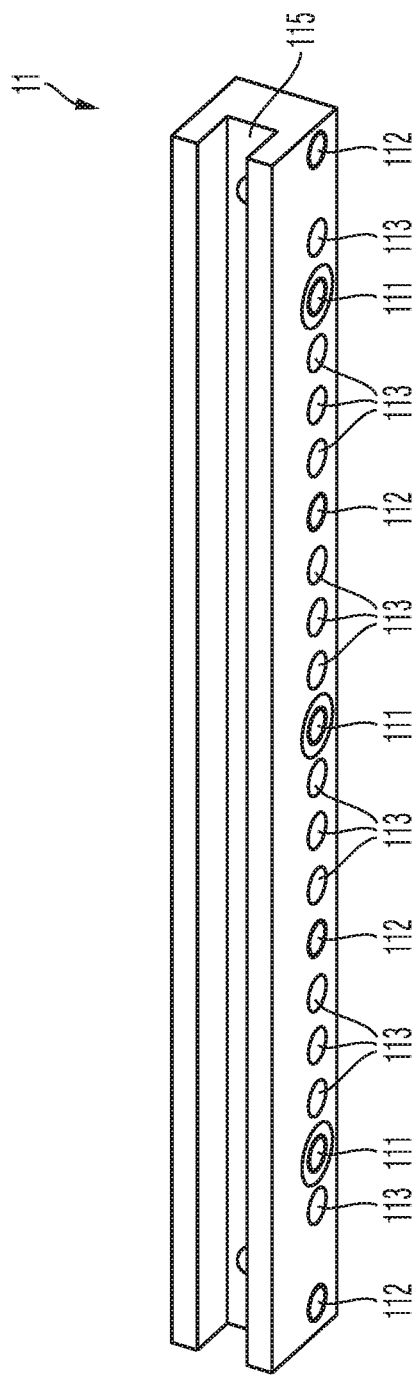
FIG. 10 is a schematic perspective view of a spacer element.

For example, in order to reduce the weight even further, spacer element 11 has a multitude of uninterrupted, e.g., cylindrical, recesses 113, as schematically illustrated in FIGS. 7 and 10. No fastening elements, etc., for example, engage with these uninterrupted recesses 113; instead, they remain free. The number of uninterrupted recesses 113 and the respective diameters are selected so that the weight reduction provided by uninterrupted recesses 113 does not endanger the stability of secondary part 10.

Figure 9B:
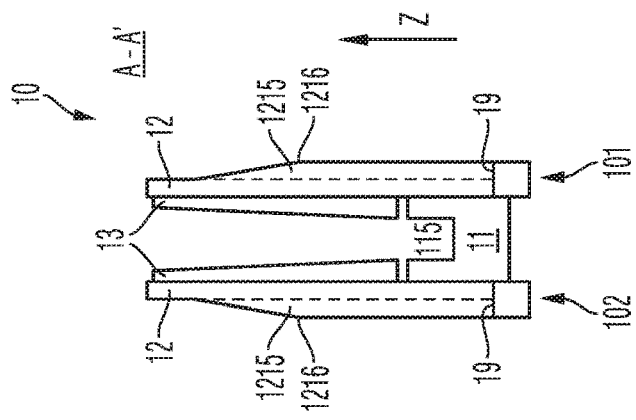
FIGS. 9A and 9B schematically illustrate, in a plan view and a cross-sectional view, respectively, a secondary part.
Figure 9A:
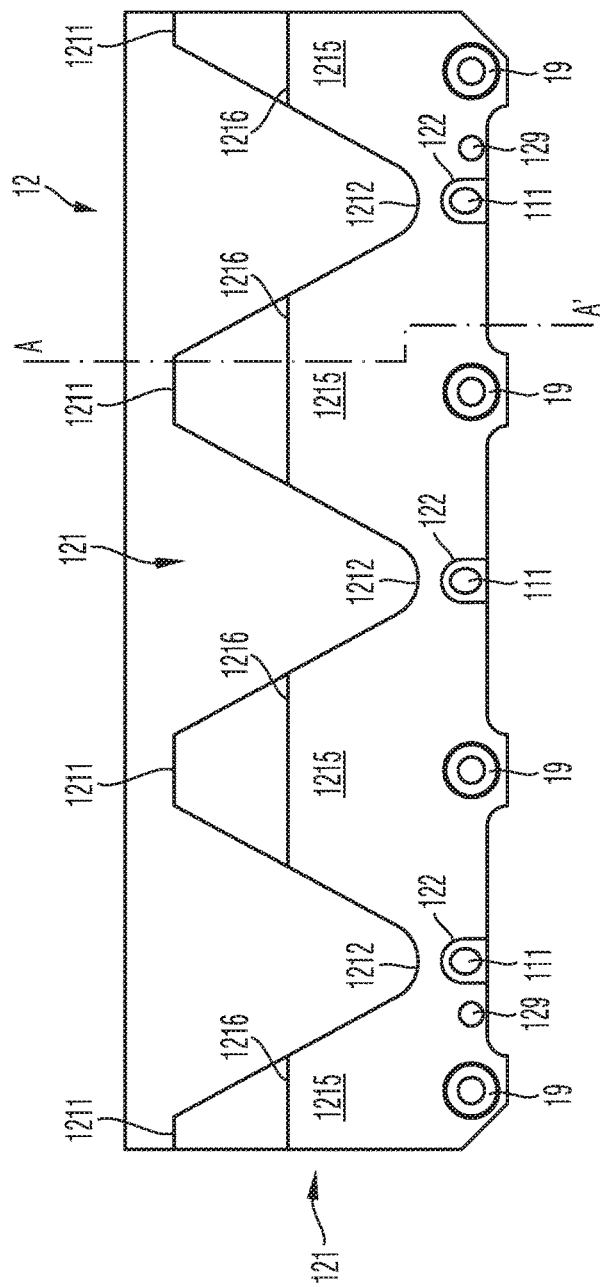

For example, as also illustrated in FIGS. 6B, 8B, and 11, it may be provided that each reinforcement element 1215 has a width at least in an upper subregion that decreases along the height of the respective limb (i.e., in extension direction Z). This achieves a further weight reduction. The respective decrease in width is created by a chamfer, for instance, which begins in the upper subregion of respective reinforcement element 1215, e.g., at line 1216 which is located in the upper third of reinforcement element 1215. The chamfer continues to the end of reinforcement element 1215, e.g., such that the width continuously transitions to the base plate thickness of yoke plate 12 at the end point, as illustrated in FIGS. 8C and 9B, for example.

Yoke plates 12 may additionally be provided with further recesses 129, which are cylindrical, for example, and which may be used during the assembly to align the two sides 101, 102 of secondary part 10 with spacer element 11. For instance, alignment pins are guided through recesses 129 and remain there until the yoke plates have been fastened via components 19 and 123. The fastening pins are then optionally removed or remain in recesses 129.

The discussion above with respect to FIG. 1 correspondingly apply to the exemplary embodiment illustrated in FIG. 11. In the exemplary embodiment illustrated in FIG. 11, optional reinforcement structures 121 are provided, which may be arranged according to the above descriptions.

What is claimed is:

1. An ironless linear motor, comprising:
    a secondary part including:
        a spacer;
        yoke plates forming two limbs and attached to the spacer, the yoke plates arranged opposite to each other and extending in planes parallel to the magnetic path; and
        a plurality of permanent magnets fixed in place on inner sides of the yoke plates oriented toward the magnetic path; and
    a primary part adapted for linear movement along the magnetic path;
    wherein the permanent magnets have a width that decreases in an extension direction perpendicular to the magnetic path; and
    wherein the primary part has a constant width along the extension direction;
    wherein the permanent magnets have a maximum width on a lower side oriented toward the spacer and a minimum width at an upper side; and
    wherein the width of the permanent magnets decreases along at least 40% of a height of the permanent magnet in the extension direction.

2. The ironless linear motor according to claim 1, wherein the minimum width is less than 98% of the maximum width.

3. The ironless linear motor according to claim 1, wherein the width of the permanent magnets is constant at least in a lower portion of the permanent magnet in the extension direction, and the width of the permanent magnets decreases only in an upper portion of the permanent magnet.

4. The ironless linear motor according to claim 1, wherein the width of the permanent magnets decreases linearly along the extension direction.

5. The ironless linear motor according to claim 1, wherein the permanent magnets have a trapezoidal cross-sectional area that is arranged perpendicular to the magnetic path.

6. The ironless linear motor according to claim 1, wherein the width of the permanent magnets decreases non-linearly along the extension direction.

7. The ironless linear motor according to claim 1, wherein the permanent magnets have a cross-sectional area situated perpendicular to the magnetic path that does not change in a direction of the magnetic path.

8. The ironless linear motor according to claim 1, wherein the secondary part provides an air gap that is substantially constant along the extension direction.

9. The ironless linear motor according to claim 1, wherein the two yoke plates have a substantially rectangular cross-sectional area arranged perpendicular to the magnetic path.

10. The ironless linear motor according to claim 1, wherein the two yoke plates include a reinforcement structure on an outer side being formed by a periodic change in a plate width in a direction of the magnetic path.

11. The ironless linear motor according to claim 10, wherein the spacer includes a number of installation points adapted to attach the secondary part to another component, local minima of the reinforcement structure overlapping with the installation points along a direction of the magnetic path.

12. The ironless linear motor according to claim 10, wherein the reinforcement structure is adapted to counteract and/or avoid bending of the yoke plates.

13. The ironless linear motor according to claim 1, wherein the spacer includes a plurality of uninterrupted free recesses adapted for weight reduction of the spacer.

14. The ironless linear motor according to claim 13, wherein the recesses are cylindrical.

15. The ironless linear motor according to claim 1, wherein the yoke plates include recesses adapted to align the yoke plates and the spacer.

16. The ironless linear motor according to claim 1, wherein magnetic poles of the permanent magnets on opposite yoke plates are complementary.

17. The ironless linear motor according to claim 1, wherein magnetic poles of the permanent magnets alternate along the magnetic path.

18. The ironless linear motor according to claim 1, wherein the permanent magnets are fixed in place on the inner sides of the yoke plates by a bonding agent that compensates for bending of the yoke plates.

19. The ironless linear motor according to claim 1, wherein an entire height of the primary part that is located between the permanent magnets has the constant width along the extension direction.

* * * * *